United States Patent
Lu et al.

(10) Patent No.: US 7,907,038 B2
(45) Date of Patent: Mar. 15, 2011

(54) ELECTROMAGNETIC FLOW CONTROL, METHODS AND USES

(75) Inventors: Frank K. Lu, Arlington, TX (US); Donald R. Wilson, Arlington, TX (US); J. Craig Dutton, Urbana, IL (US)

(73) Assignee: Board of Regents, The University of Texas System, Austin, TX (US)

( * ) Notice: Subject to any disclaimer, the term of this patent is extended or adjusted under 35 U.S.C. 154(b) by 373 days.

(21) Appl. No.: 12/100,890

(22) Filed: Apr. 10, 2008

(65) Prior Publication Data

US 2009/0038408 A1 Feb. 12, 2009

Related U.S. Application Data

(60) Provisional application No. 60/922,768, filed on Apr. 10, 2007.

(51) Int. Cl.
*H01F 3/00* (2006.01)
*F16K 31/02* (2006.01)

(52) U.S. Cl. ............... 335/256; 251/129.09; 251/129.15
(58) Field of Classification Search ............. 123/129.09; 251/129.15, 129.09; 335/256
See application file for complete search history.

(56) References Cited

U.S. PATENT DOCUMENTS

| | | | | |
|---|---|---|---|---|
| 6,874,751 | B2 * | 4/2005 | Ojima et al. | 251/129.15 |
| 7,131,426 | B2 * | 11/2006 | Ichinose et al. | 123/446 |
| 7,303,177 | B2 * | 12/2007 | Harcombe | 251/129.09 |
| 2004/0090296 | A1 * | 5/2004 | Ojima et al. | 335/256 |

* cited by examiner

*Primary Examiner* — Jewel Thompson
(74) *Attorney, Agent, or Firm* — Chowdhury & Georgakis, P.C.

(57) ABSTRACT

Actuation for control of surfaces is provided through use of a conducting material comprising electrolyte particles electrically charged with electromagnetic fields in boundary layers. Interactions of the electrically charged particles with electromagnetic fields in boundary layers are coordinated for generation of control forces for various applications.

5 Claims, 17 Drawing Sheets

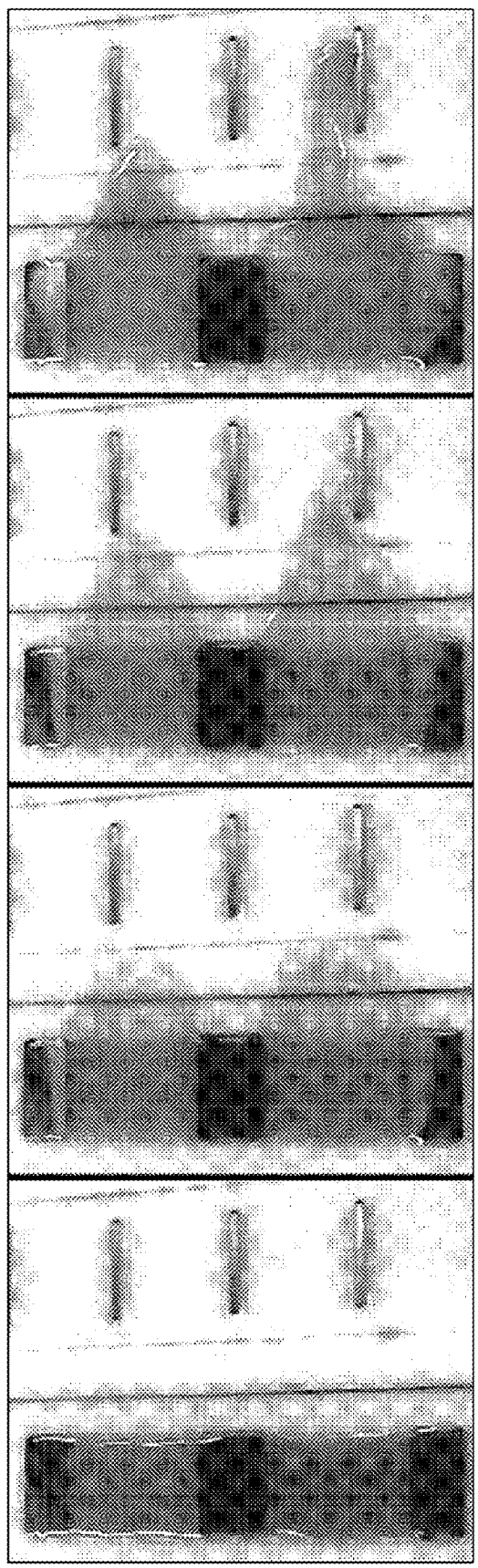

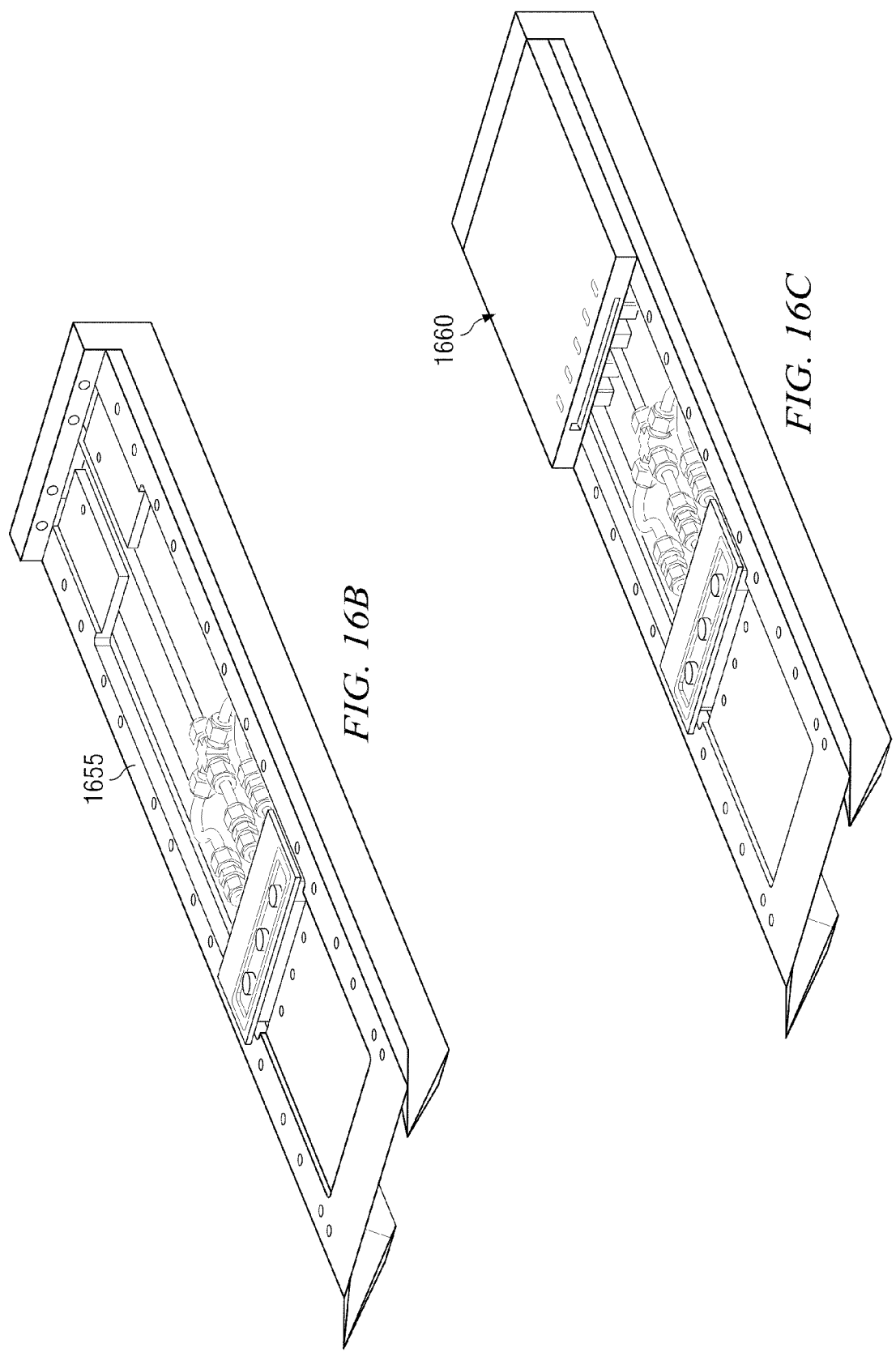

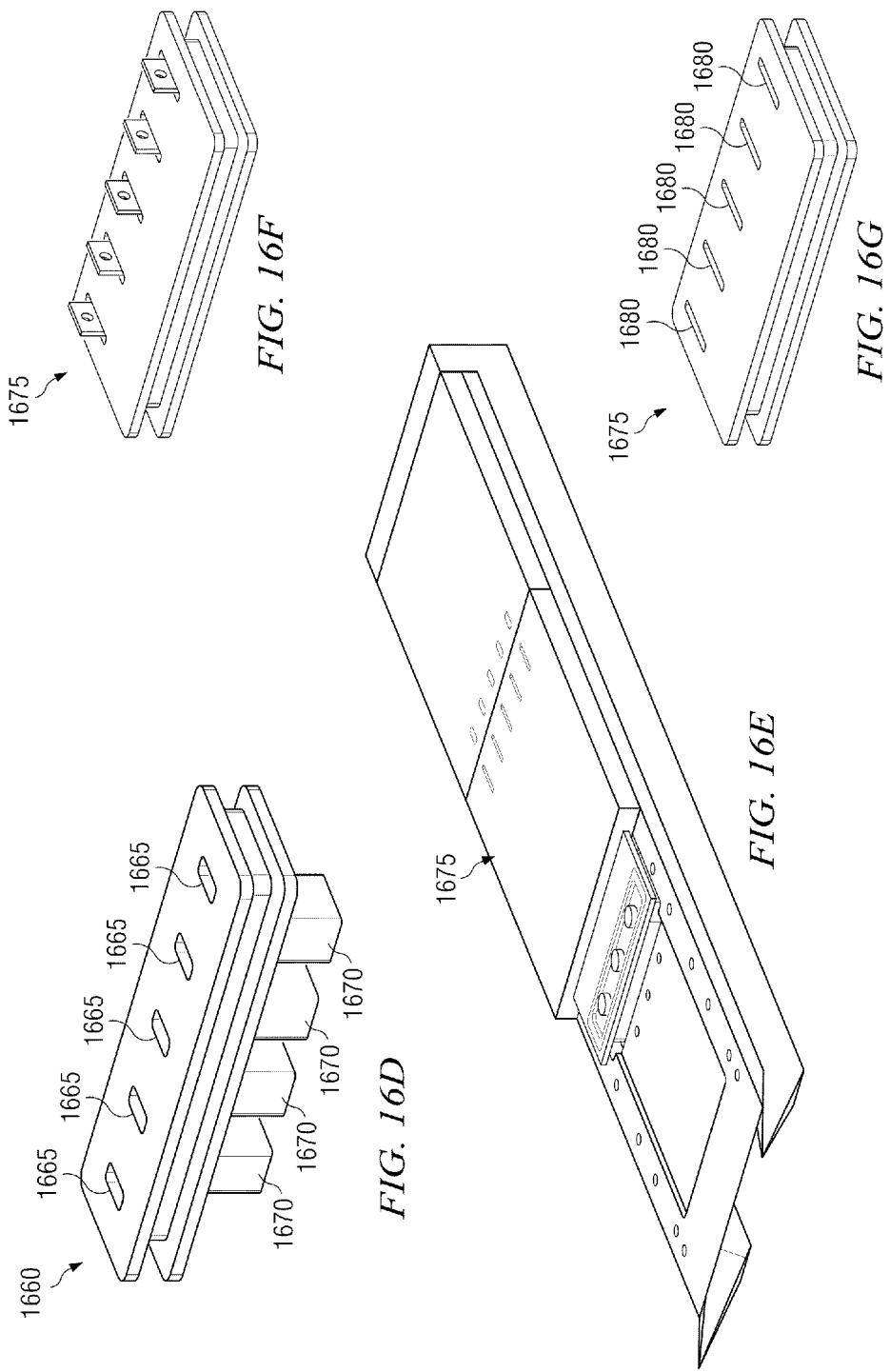

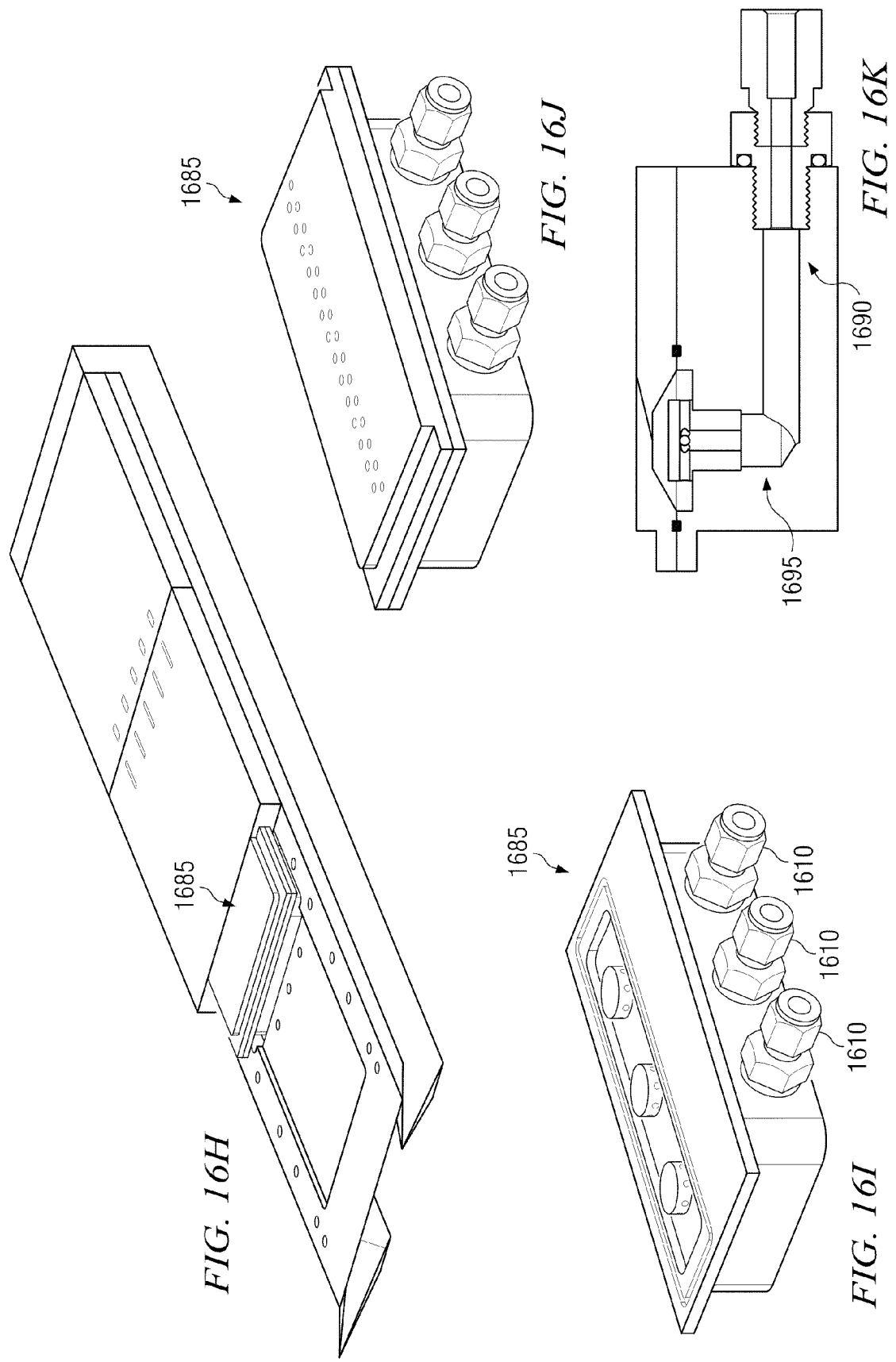

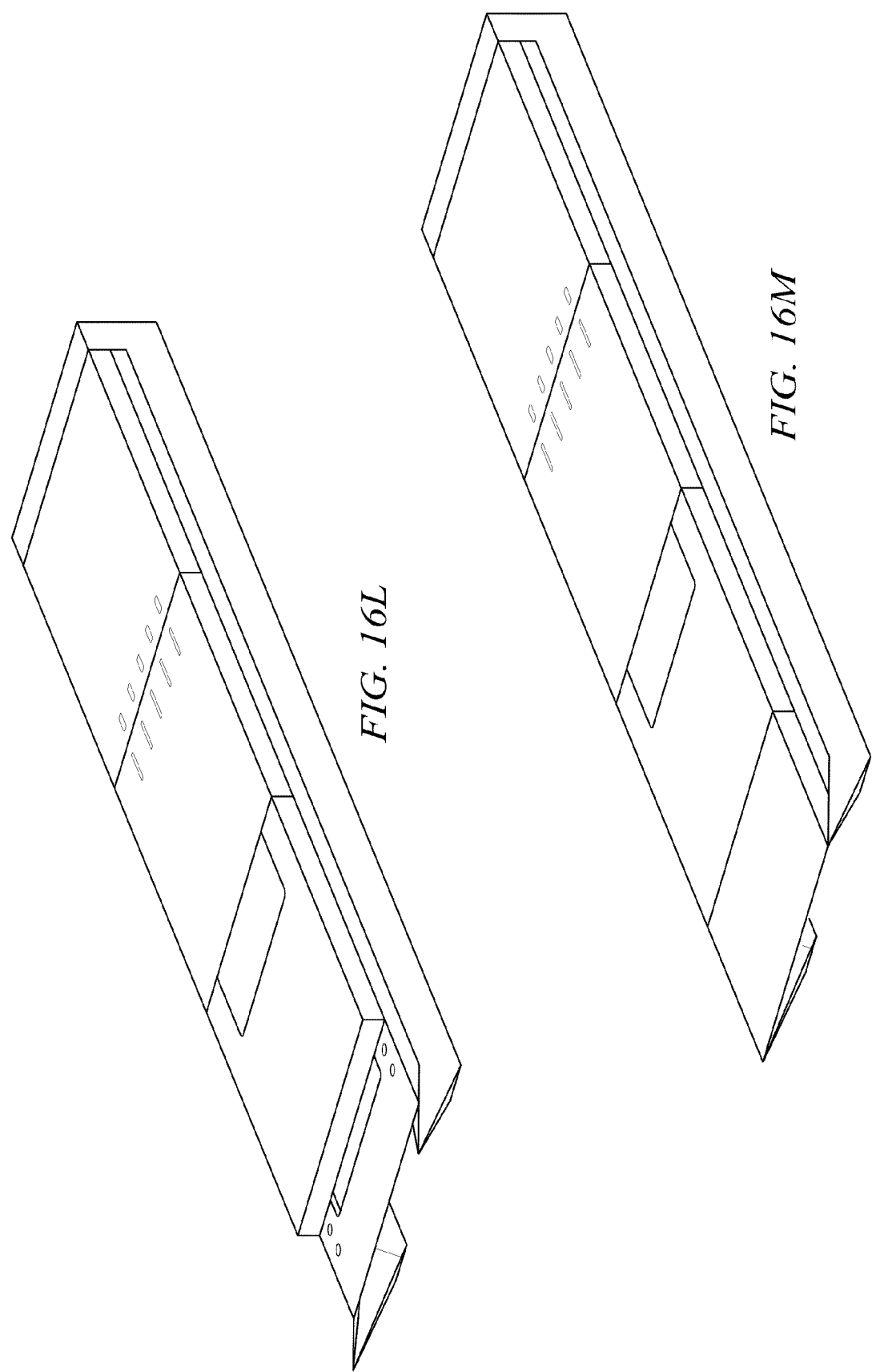

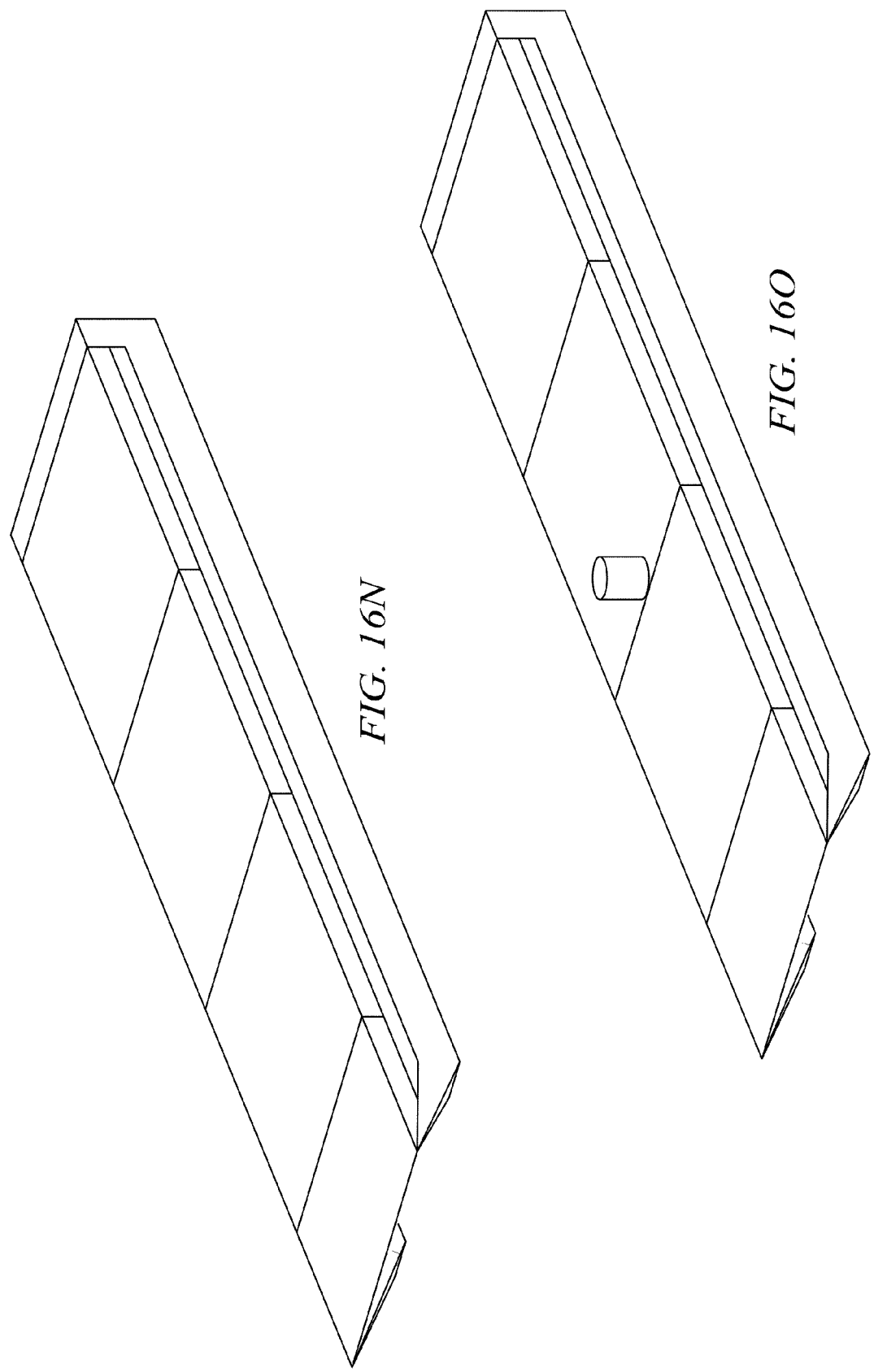

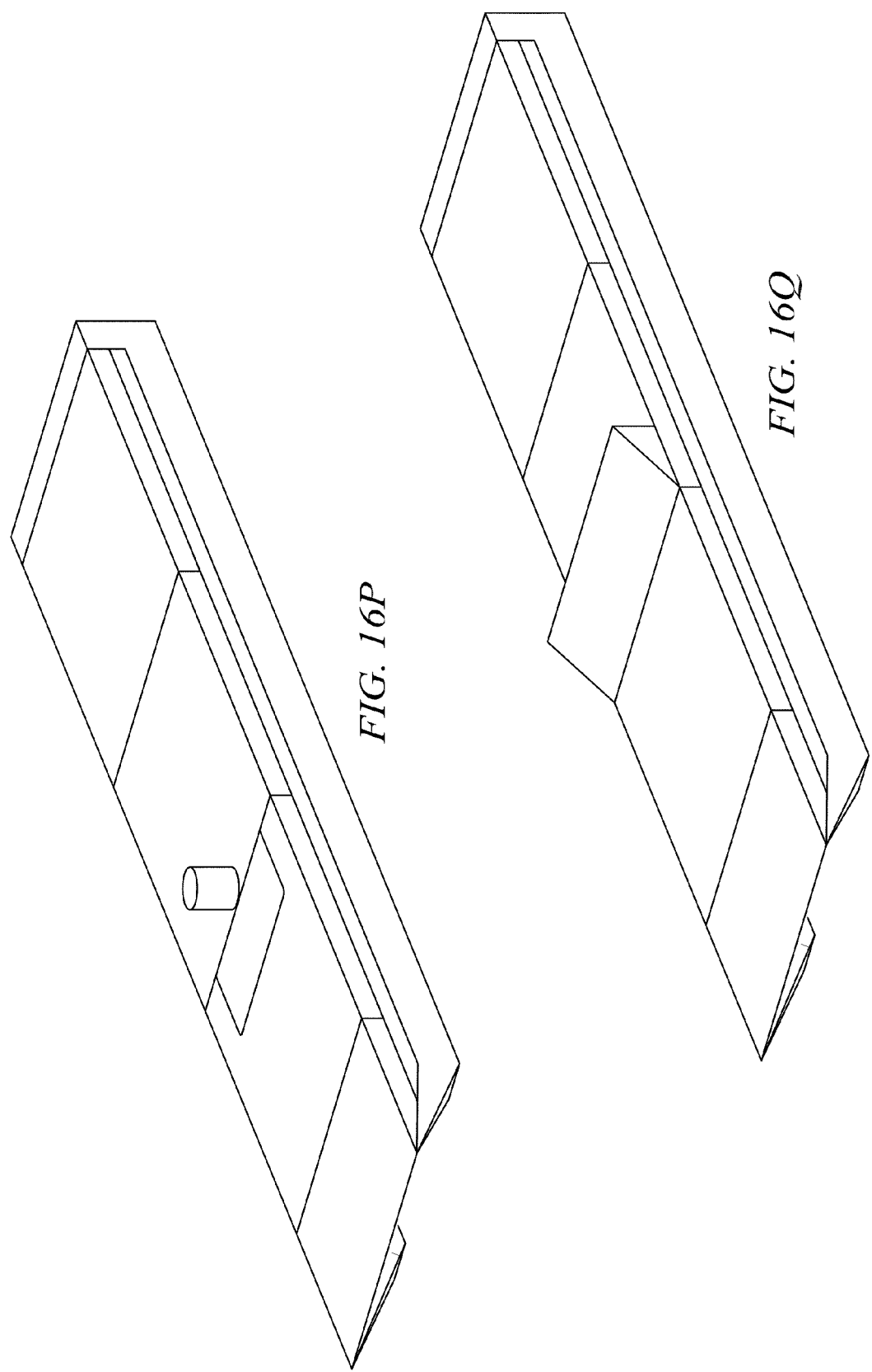

ELECTROMAGNETIC FLOW CONTROL, METHODS AND USES

CROSS REFERENCES TO RELATED APPLICATIONS

This application claims the benefit of U.S. Provisional Application No. 60/922,768 filed Apr. 10, 2007.

BACKGROUND OF THE INVENTION

This relates in general to the field of electromagnetics and, more particularly, to electromagnetic flow control.

Current methods for high-speed aerodynamic surface and vehicle control involve actuation of large, bulky control surfaces or the use of reaction jets. Unfortunately, such methods have adverse consequences for high-speed flight, such as high surface loading, high heating and flow unsteadiness. The methods have also been found to cause undesirable aerodynamic interference with other vehicular components.

SUMMARY OF THE INVENTION

One or more problems associated with current limitations in aerodynamic actuation are solved as described herein. Such improvements include an actuator for controlling surfaces that is lightweight, compact and requires very low power.

Actuation is achieved via an addition of conducting materials. The conducting materials are provided as electrically charged particles or droplets with electromagnetic fields in boundary layers.

Conducting materials for control of surface described herein generally comprise a material having a high surface area and conductivity provided by dispersion, wherein the conducting materials are sized and may be functionalized with an alkali salt to provide conducting materials in the nanometer or micrometer size range.

Further described is a controller comprising a conducting material provider proximate to a surface, corona electrodes proximate to the surface and downstream from the conducting material provider and an electromagnet actuator proximate to the surface and downstream from the corona electrodes.

Methods for controlling one or more surfaces as described herein generally include injecting electromagnetically active conducting materials into an air flow proximate to a surface, applying a first electric field downstream from an injection point to create a plasma and applying a second electric field and a magnetic field downstream to the plasma wherein the second electric field and the magnetic field are oriented such that a force is exerted on the surface.

Those skilled in the art will further appreciate the above-noted features and advantages of the invention together with other important aspects thereof upon reading the detailed description that follows and in conjunction with the drawings.

BRIEF DESCRIPTION OF THE DRAWINGS

For a more complete understanding of the present invention and the advantages thereof, reference is now made to a description, taken in connection with the accompanying figures, wherein:

FIG. 11A-D illustrates four frame by frame images of a Lorentz force generator plate actuation using a conduction solution and dye for visualization;

FIG. 16B shows a first successive stage of construction of a model Lorentz force generator;

FIG. 16C shows a further successive stage of construction of a model Lorentz force generator;

FIG. 16D shows an enlarged view of a Lorentz force plate of the model Lorentz force generator of FIG. 16C;

FIG. 16E shows a further successive stage of construction of a model Lorentz force generator;

FIG. 16F shows a bottom of an ionization source plate of the model Lorentz force generator of FIG. 16E;

FIG. 16G shows a top of the ionization source plate of the model Lorentz force generator FIG. 16E;

FIG. 16H shows a further successive stage of construction of a model Lorentz force generator;

FIG. 16I shows a top of a seed injection plate of the model Lorentz force generator of FIG. 16H;

FIG. 16J shows a bottom of the seed injection plate of the model Lorentz force generator of FIG. 16H;

FIG. 16K shows a side view of the seed injection plate of the model Lorentz force generator of FIG. 16H;

FIG. 16L shows a further successive stage of construction of the model Lorentz force generator;

FIG. 16M shows a further successive stage of construction of the model Lorentz force generator;

FIG. 16N shows a further successive stage of construction of the model Lorentz force generator;

FIG. 16O shows a generic representation of a junction of a further successive stage of construction of the model Lorentz force generator;

FIG. 16P shows a generic representation of a junction of a further successive stage of construction of the model Lorentz force generator;

FIG. 16Q shows a further successive stage of construction of the model Lorentz force generator;

DETAILED DESCRIPTION OF THE INVENTION

Figure 1A:
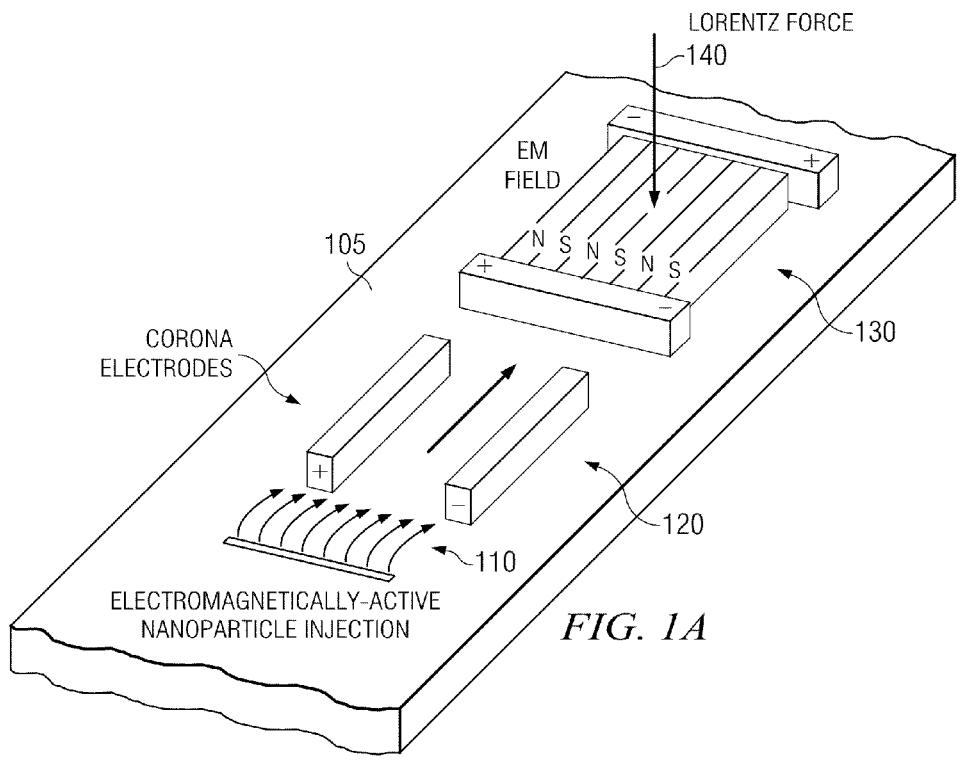
FIGS. 1A and 1B illustrate schematics of representative electromagnetic flow control (EMFC) using electrically active seeding of conducting materials.

Although making and using various embodiments are discussed in detail below, it should be appreciated that the present invention provides many inventive concepts that may be embodied in a wide variety of contexts. The specific aspects and embodiments discussed herein are merely illustrative of ways to make and use the invention, and do not limit the scope of the invention.

In the description which follows like parts may be marked throughout the specification and drawing with the same reference numerals, respectively. The drawing figures are not necessarily to scale and certain features may be shown exaggerated in scale or in somewhat generalized or schematic form in the interest of clarity and conciseness.

As described herein, EMFC uses electromagnetic (EM) interactions to manipulate air flow that is ionized by seeding with electromagnetically conducting materials. Control forces and moments typically produced by a traditional flap are provided through a distortion of flow. Unfortunately, such forces and moments occur with large penalties of high power consumption, bulk and weight. In addition, adverse effects such as increased drag or localized heating are high. Theoretical studies suggest that EMFC could provide more desirable features. To date, however, current concepts using EMFC exhibit poor fluid-EM coupling.

There are two primary approaches applied when using electromagnetic (Lorentz) forces for flow control: (a) electric field alone, which is known as plasma flow control, and (b) a combination of electric and magnetic fields. Solely applying an electric field causes a plasma to either accelerate or decelerate depending on electrode arrangement. This distorts the flowfield to produce a virtual aerodynamic surface. The distortion, however, appears to be too small for use in a high dynamic pressure environment of high-speed flows. While the flow may be modified through volumetric energy addition, new attempts to affect the flow volume have been plagued with difficulties in energy deposition.

The second approach involves MHD interactions between a weakly ionized gas and an electromagnetic field and entails volumetric or surface interactions, as in plasma flow control. Volumetric interactions, however, as understood and applied, center primarily on hypersonic propulsion. Yet, as further described herein, MHD interactions appear appropriate for high-speed aerodynamic applications because they scale quadratically with the magnetic field strength according to the interaction parameter (1), which is $$I_M = \sigma B^2 L/(\rho U_\infty) \quad (1).$$

The drawback to date has been that existing magnet technology makes volumetric MHD concepts impractical for aerodynamic applications because magnets that produce 1-5 T (similar to that used with magnetic resonance imaging) are massive and bulky. There is, to date, inadequate understanding of volumetric MHD when applied to high-speed aerodynamic flows.

It is, thus, described herein that two parameters govern electromagnetic interaction of weakly-ionized gas flows of interest here, namely, the interaction parameter $I = \sigma EBL/(\rho U_\infty^2)$ and the Hartmann number $H\alpha = BL\sqrt{\sigma/\mu}$ where $\sigma$ is the gas conductivity, E is the electric field strength, B is the magnetic field strength, L is an interaction length and $\mu$ is the gas viscosity. For high-speed flows, a value of I is ostensibly small due to a low value of $\sigma$ and the large flow speed. Hence, volumetric EMFC have appeared to be problematic. However, as newly determined by the inventors and further described herein, localized boundary-layer control is appropriate because only local ionization is needed near the surface where the velocity and density are low, and where the electromagnetic fields are most intense.

As described herein, a nonlinear coupling between the boundary-layer flow and the electromagnetic fields may significantly influence the local flowfield. Accordingly, instead of I, an interaction parameter based on boundary-layer scales appears more appropriate, namely, $I^* = \sigma EBL/(\rho u_*^2)$, where $u_* = \sqrt{\tau_w/\rho_w}$, is a friction velocity and where the subscript w refers to wall values. This parameter may also be nearly 300 times that of I, thereby raising the possibility of practical EMFC.

Based on such descriptions, a combined electromagnetic approach for flow control is appropriate for aerodynamics because it may yield large values of I*. Two immediate strategies are described, both involve raising electric and magnetic field strengths. However, the electric field strength may be too excessive as arcing would otherwise occur. As described herein, a reasonable value of E for producing a glow discharge of charged conducting materials (also known as a corona discharge) appears to be on the order of up to about 50 kV/m.

For achieving a strong magnetic field, high-strength superconducting or electromagnets are clearly impractical for aerospace applications because of their bulk and mass. An upper bound of B<1 T may be achieved by permanent, rare earth magnets of acceptable size and mass.

In addition, as described herein, not only is there a raising of electric and magnetic field strengths, raising plasma conductivity is achieved through artificially seeding the flow is a preferred feature for successful implementation of EMFC of high-speed boundary layers. Cesium carbonate powder was used to achieve conductivities of 1-10 mho/m in high-pressure aerodynamic plasmas (Lu F K, et al. Measurement Sci Tech 16(9):1730-1740, 2005), a level of conductivity that is in contrast to a very low value of 0.06 mho/m found in unseeded air plasmas at high-speed flight conditions (e.g., as reported in Kimmel R L, et al. AIAA Paper 2004-2661) as well as theoretical and numerical work that demonstrates EMFC to require a conductivity as high as 100 mho/m, which is a value that may only be found in liquid metals and simply unattainable in natural air flows.

As described herein, to obtain a high level of electrical conductivity, electrically conducting materials were introduced upstream of an EM field. In one or more embodiments, the conducting materials are provided as very small particles, such as nanoparticles and microparticles. The advantage of having conducting materials of this size is to provide a large surface area density and narrow particle size distribution. The large surface area density is conducive to ionizing the conducting materials through corona discharge instead of thermal ionization of an alternative material, such as raw cesium carbonate, which requires high temperatures. While sized particles as small as micron-sized cesium carbonate powder may settle out of the flow, as described herein, nanoparticles, unlike microparticles, have an advantage of being easily dispersed and readily carried by flow.

Generally, conducting materials are electrolytes provided as powders or as aqueous or non-aqueous solutions. Conducting materials may be suitable as is or further functionalized to increase conductivity. Examples of suitable materials are conductive compositions with a high surface area, (e.g., salt water, graphite flakes and aluminum flakes). In addition or as an alternative, materials having a low conductivity may be functionalized to increase their conductivity. Examples of the latter include clay flake particles coated with 2 nm gold particles. Also suitable are materials, such as potassium carbonate and cesium carbonate, provided as powders.

For conducting materials in solution, when in an aqueous solution, the materials are typically provided as electrolytes in solution, introduced as droplets, typically via atomization. The produced droplets will typically be in a micrometer size range (typically, less than 10 micrometers, cross-sectional diameter). Non-aqueous solutions are provided in suspension and may be introduced in a similar manner at about a similar size range (typically, less than 10 micrometers, cross sectional diameter).

When functionalization is performed, a typical method includes the use of an alkali salt (e.g., potassium or cesium carbonate) to lower the ionization potential of the conducting material when airborne. Ionization of a conducting material is achieved when an intense electric field is applied. Suitable alkali salts are selected based on particle-particle interactions, particle charge, and particle dispersion, as is known to one of ordinary skill in the art.

As described, conducting materials are provided as a dispersion (e.g., by injector) or by droplets (e.g., injector or atomizer). Suitable conducting materials should not be ionized before passing through a voltage field described further. Using EMFC hardware as further described herein, suitable conducting material seeding is now described for EMFC targeted for aerodynamic use. In such scenarios, air will carry a conducting material, which is accelerated with application of an electromagnetic field.

Figure 1B:
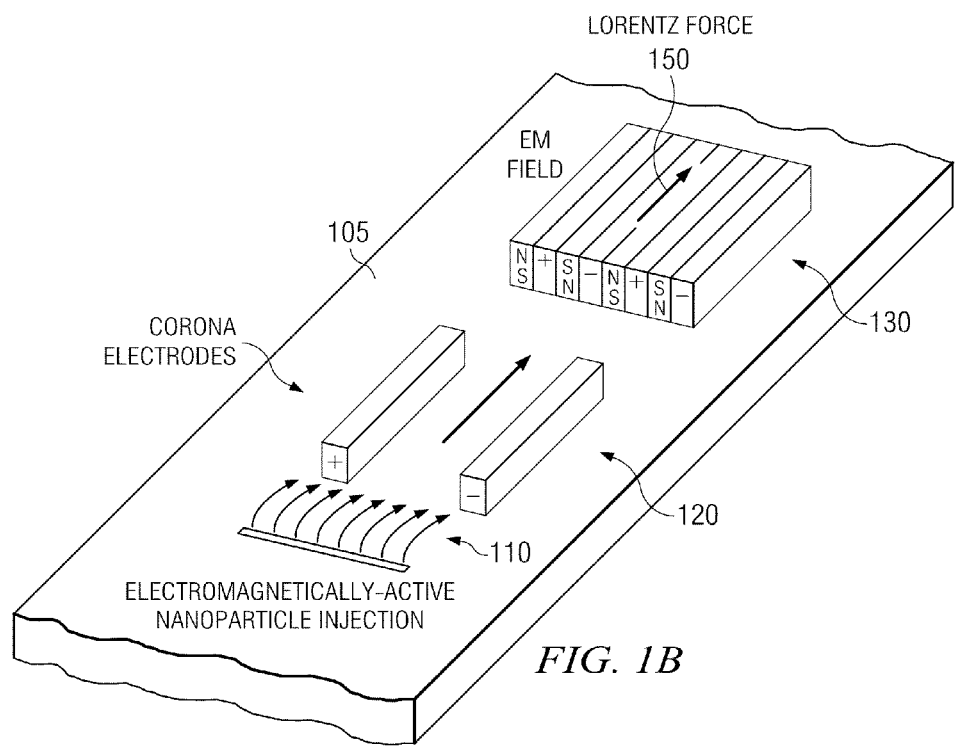

FIGS. 1A and 1B are provided as examples of representative EMFC systems for evaluation of conducting materials, in which all hardware for the system is embedded on a suitable surface 105. Conducting material 110 is introduced into a boundary layer and subjected to an electric field along 120. The electric field may be by an alternating current (AC) or direct current (DC). This creates a nonequilibrium, cold plasma in which positive and negative conducting materials are convected downstream to an actuator 130 with only a small amount of recombination. For AC excitation, a high-frequency AC power supply may be used to produce the corona. AC excitation does not cause charged conducting materials to be neutralized since heavy radicals move far more slowly than electrons in the presence of an electric field. Moreover, a low temperature of the plasma ensures that recombination is slow. Room temperatures are suitable. As depicted, a plasma created using lightweight and compact hardware with only low power is advantageous as compared with other techniques, such as electron beam or microwave excitation.

Actuator 130 typically comprises an array of electrodes and magnets to produce a Lorentz force. Commercially available neodymium-iron-boron magnets are suitable as permanent magnets. When a perpendicular electrode-magnet arrangement is used, a normal Lorentz force is produced, as shown by the vertically downward arrow 140 in FIG. 1A. As is known to one of ordinary skill in the art, the Lorentz force may also act vertically upward and depends on the polarity orientation of the electrode-magnet arrangement. Such a normal force may be used for controlling a surface and maneuvering a vehicle. As is also apparent to one of ordinary skill in the art, an electromagnetic actuation system, as depicted in FIG. 1, is a much simpler and more improved configuration than conventional control surfaces used presently. Switching the electric field polarity will produce rapid vehicular maneuvers, which may occur for example when applied with high-speed missiles.

FIG. 1B shows an alternative arrangement also suitable for various flow control strategies. In FIG. 1B, a Lorentz force (arrow 150) is parallel to the incoming flow and, hence, accelerates it. Electrodes for a parallel configuration may be driven by an AC field to create a periodic forcing of the flow and is thus beneficial for separation flow control. The periodic forcing may be further tuned to excite any large-scale turbulence structure(s) in the boundary layer.

Accordingly, as described is a method for controlling a surface, the method comprising injecting electromagnetically active conducting materials into an air or gas flow proximate to a surface, applying a first electric field downstream from an injection point to create a cold plasma (e.g., air or gaseous plasma); and applying a second electric field and a magnetic field downstream to the cold plasma wherein the second electric field and the magnetic field are oriented such that a force is exerted on the surface. As such, a described controller may be positioned in one of a number of exterior and interior locations on the surface, including the engine and/or exhaust.

Figure 2:
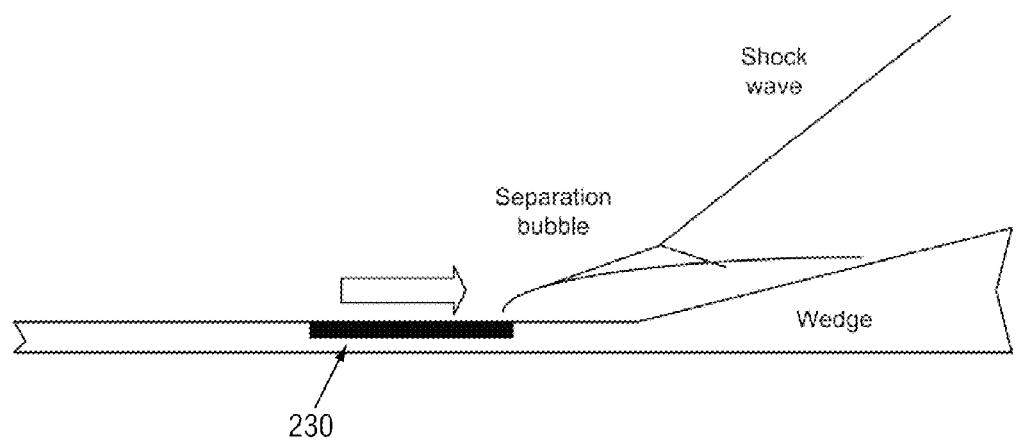
FIG. 2 depicts a schematic of EMFC control of a two-dimensional, ramp-induced boundary-layer separation.

In yet another example of separation flow control, an EMFC actuation system 230, similar to that depicted in FIG. 1, is placed ahead of a ramp-induced shock boundary-layer interaction as depicted schematically in FIG. 2. Here, an energized boundary layer, particularly of a large-scale turbulent structure, is provided. With FIG. 2, an EMFC system, such as that depicted in FIG. 1, is optimized based on forces and pressures developed and as a function of plasma conductivity, the electric field strength and the magnetic field intensity.

As described herein, an EMFC system provides improved control forces and moments as compared with those produced by a traditional flap through a distortion of flow. Such forces and moments are without larger penalties of large power consumption, bulk and weight. In addition, adverse effects such as increased drag or localized heating are reduced with the EMFC system described herein. Moreover, the EMFC system described is fast-acting, a feature that is desirable for high-speed flight.

A system described herein generally comprises three integrated components, including a conductive material (e.g., particles) seeding mechanism, an ionization source and a Lorentz force generator source. In one or more embodiments, the Lorentz force generator comprises a series of electrodes and magnets. Advantageously, the magnets include rare earth magnets. Electrodes may be surface mounted. The integrated components are each described in further detail below.

Figure 3:
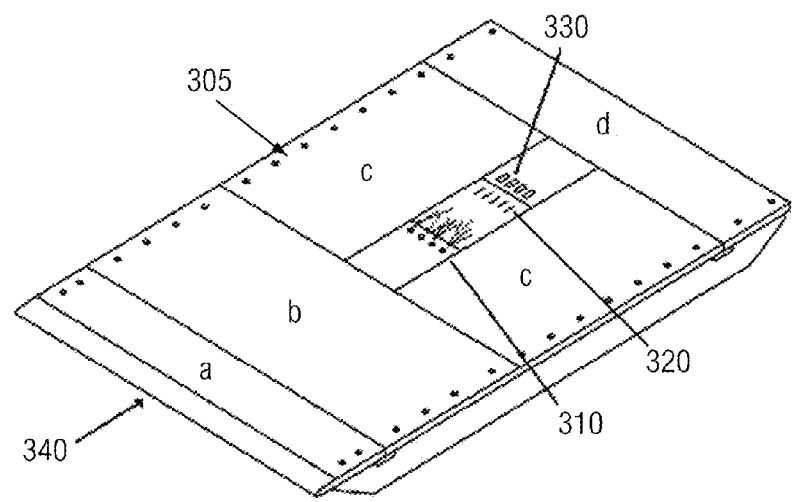
FIG. 3 depicts an EMFC surface and suitable components.

With the system, a cold plasma with a high level of conductivity is generated, as described herein. To accomplish this, an electrically conducting material as particles are introduced upstream of an EM field as represented in FIG. 3. Components of FIG. 3 include a working surface 305, conducting material 310, ionization source 320, and Lorentz force generator 330, which are, in FIG. 3, assembled as part of a low speed wind tunnel assembly. In this fabrication, each of the ionization source and Lorentz force generator source are provided as plates, measuring about 6 inches by 8 inches. With such a construction, plates are interchangeable and may be included in a second assembly, such as that made for supersonic use. Indeed, many of the dimensions described herein are not crucial. Assemblies are subscale for practical purposes and for proof-of-concept testing using a small-scale wind tunnel.

Still referring to an assembly of FIG. 3, the embodiment includes a leading edge of a first flat plate (plate a) that is generally elliptical and has a fineness ratio of 0.3, as typically found for low-speed boundary layer study. The EMFC device itself is located between two filler plates, labeled c. A trailing edge plate d completes the described embodiment of FIG. 3.

Proof-of-concept testing of the embodiment of FIG. 3 was performed in a closed circuit, low-speed wind tunnel with a closed test section. The test section was 61 cm high, 91 cm wide and 190 cm long (24 in.×36 in.×75 in.). The tunnel has a continuously variable speed capability from zero to approximately 50 m/s (160 ft/s). At a maximum operating condition, the tunnel is capable of obtaining a unit Reynolds number of 3 million/m (1 million/ft).

In a first method of increasing conductivity, particle seeding is provided. Particles were delivered through one of two representative processes: dry state via a nitrogen gas fluidized bed, as shown in FIG. 4, or suspension in an insoluble liquid, as shown in FIG. 5.

Figure 5:
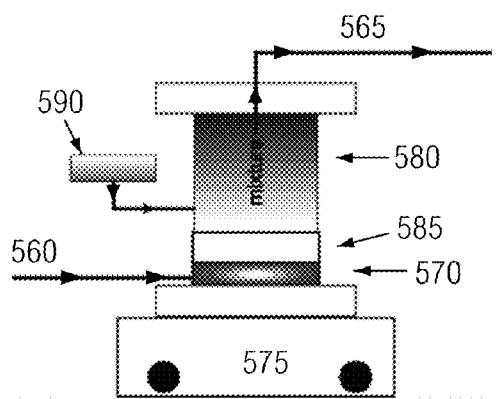
FIG. 5 depicts heated and pressurized fluidized bed injection for dry seeding.

The pressurized liquid injection depicted schematically in FIG. 5 delivers an aerosol mixture of conducting particles 590 (which, may be potassium carbonate or cesium carbonate, as examples) suspended in an insoluble liquid. Acetone and ethanol are two suitable carrier liquids; other suitable carriers may be used, as known to one of skill in the art. Other components involved with pressurized liquid injection include a nitrogen supply 560, magnetic stirrer 575, a nitrogen bed 570, a porous layer 585, a suspension mixture 580 and an outflow port 565 (FIG. 5). A pressurized liquid injection provides accurate conductive particle flow rate measurements with very even injection and generally little conglomeration of particles, thus providing particles in a good suspension.

Figure 4:
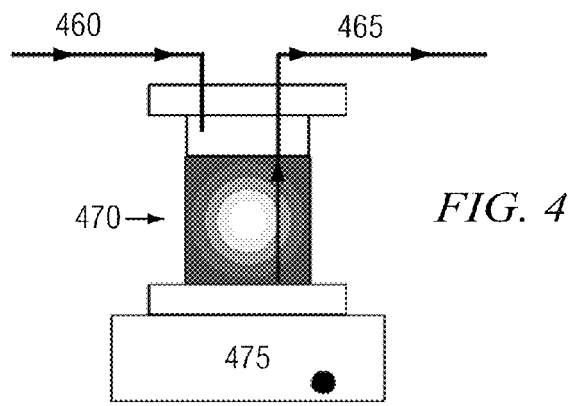
FIG. 4 depicts pressurized injection system for liquid suspension.

Fluidized bed injection depicted schematically in FIG. 4 is an alternative process of delivery, which may be advantageous in certain instance, particularly when using flammable particle suspensions (e.g., potassium carbonate). This method works with conductive particles relying on a more compact design. Additional components involved with a fluidized bed injection are an inflow port 460 comprising conducting particles, a nitrogen bed 470, a magnetic stirrer 475, and an outflow port 465 comprising a suspension mixture (FIG. 4).

Particle suspensions may comprise a single particle type or more than one particle type, the particles comprising at least one electrolyte. In one example, an electrolyte solution of non-iodized common sea salt and distilled water was used as the suspension mixture, the sea salt comprising the conducting material. The concentration of the solution was approximately 14.92 wt. % NaCl. With such a suspension, ionic bonds of the sea salt compound completely dissociate when added to water, resulting in a solution that easily conducts currents. A salt/water solution was advantageous for visualization of a Lorentz force plate actuation and ionization plate corona discharges as further described herein.

The ionization plate described herein requires a capability of interacting with the conducting material (i.e., ionized particles) that it creates without arcing. In addition, convection induced from the boundary layer flow or some other means must transport the conducting material as ionized particles from the ionization plate to the Lorentz force plate some distance away (in the subscale device of FIG. 3, the distance was a few cm downstream).

Ionization may be provided by one or more suitable methods. In a first method of ionization, seed particles are passed though a high voltage DC electric field, known as field ionization. Here, a strong electric field forcibly extracts an electron from an atom without the need for high current. By charge exchange ionization, electrons are exchanged with another atom through the outer valence shells. The dimensions of the electrodes are dictated by the minimum separation distance required to prevent arcing. Thin electrodes tend to produce more of a corona discharge effect due to the concentration of charge on sharp surfaces. Using such principles, a representative ionization actuation plate was constructed with five electrodes (two positive, three ground) using approximately a one inch spacing between each. The electrodes are shown in FIG. 11.

In one embodiment, a glow discharge with a 20 kV power supply was used to generate the electric field. For maximum voltage, electrode spacing was close to the minimum requirement to prevent arcing (roughly one mm of separation per kV for air under ambient conditions). Because seeded air has an elevated electrical conductivity, arcing is prone to occur. For example, salt water solutions sprayed over the ionization generate a large amount of arcing. Arcing may be alleviated by manipulating the velocity of the flow within the boundary layer. Initial runs were conducted using an ionization plate as described herein (e.g., depicted in FIG. 3) and showed that an arc may be effectively blown out by a low-speed flow. As such, DC ionization of seeded air using a glow discharge should take place without arcing although there may be a limited range of operation between conditions that suppress it while generating an appreciable amount of ionized particles.

In another method of ionization, pulsed electrical discharges may be used. Unlike DC, pulsed discharges do not permit charge to build up on the surfaces of the electrodes, which may be a precursor to arcing. As such, a power supply may be linked to a high voltage semiconductor switch allowing for pulsed operation of up to several hundred kHz.

Following ionization, recombination of ionized particles between the ionization and Lorentz force plates may occur because there is typically a gap between the ionization and Lorentz force plates in a system described herein. For example, in a fabricated geometry of FIG. 3, there is roughly a 3 cm gap between the ionization and Lorentz force plates.

Generally, recombination rates appear to depend on properties, such as the species involved, temperature and density. While ionized gas formed by high temperature dissociation demonstrates rapid recombination, advantageously, low temperature seeded ionization has a very low recombination rate for at least two reasons. For one reason, a lower temperature means that the intermolecular collisions between particles are slower. For another reason, heavy radicals of the ionized seed material travel much slower relative to the free electrons after high voltage excitation. It is possible that nonequilibrium reactions formed between injected seed materials and air constituents during ionization may also play a role in the recombination rate. When recombination effects prove too difficult to overcome in a gap between the two plates, power supplies may be merged into one plate with two separate pulsed power supplies.

With respect to the Lorentz force plate, to create an accelerating or retarding Lorentz force, magnets and electrodes are alternated across the width of the flat plate perpendicular to the flow direction. This arrangement results in each electrode pair crossing over one embedded magnet face, with the magnetic poles interchanged across the width. Grounded electrodes are placed at each end of the actuator to maintain a uniform force direction. The arrangement may also prevent arcing from occurring to a tunnel wall or some other component.

Figure 6:
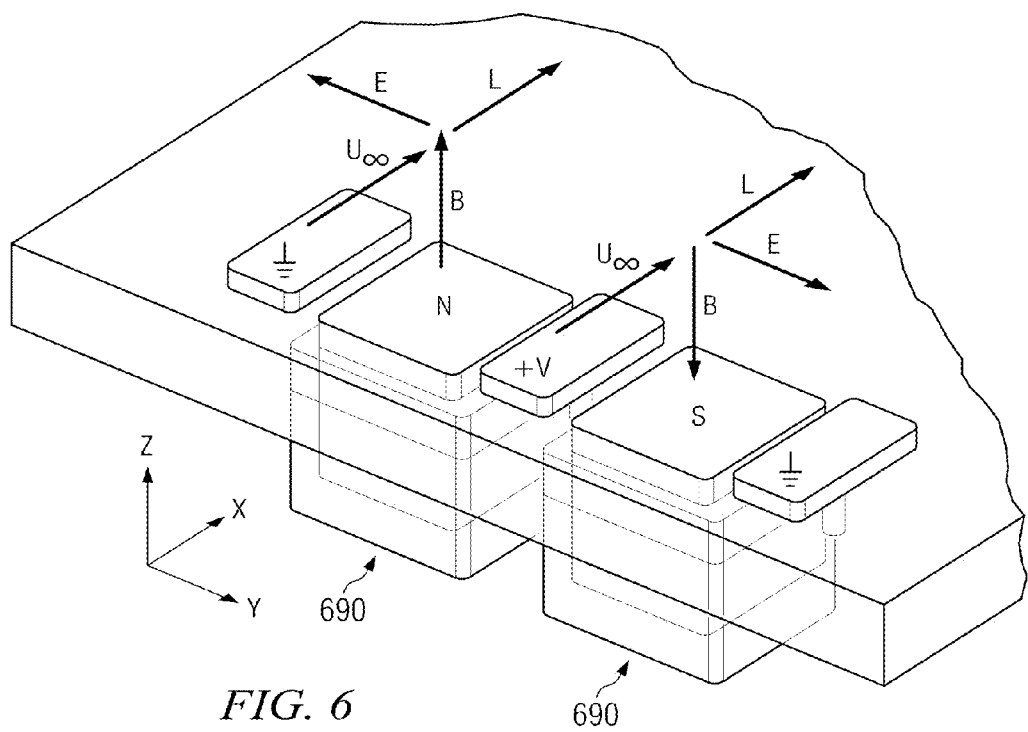
FIG. 6 depicts a schematic of a Lorentz force generator plate showing electromagnetic arrangement and force field interaction, in which a flat plate material is translucent to show embedded magnets.
Figure 7:
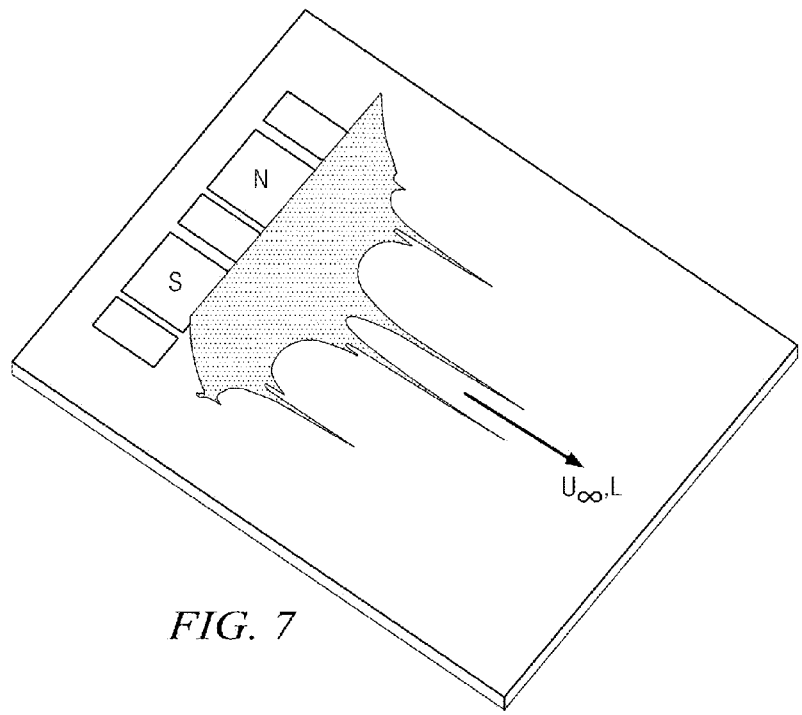
FIG. 7 depicts overlay of the Lorentz force field geometry on a three electrode, two magnet generator.

FIG. 6 shows a schematic of a representative actuator design with a single electrode that delivers power and includes an idealization of the electric and magnetic field directions. In this arrangement, magnetic and electric fields are oriented in orthogonal directions above the actuator depending on the polarity of the magnet, with the fields crossing each other to produce a Lorentz body force in a single direction acting parallel with the flow. In one embodiment, magnets 690 are embedded a few mm below the plate material because exposing the magnets would produce arcing between them and the electrodes. Representative generator plates were fabricated having a width of about 4 inches to allow for testing in both low speed and supersonic wind test tunnels.

In one example, an actuator was based around $\sigma=1$ mho/m. This value may change significantly depending on success of the ionization actuator plate. Generally, the Lorentz force generator plate design may be considered to be relatively independent of the other components of the system, when assuming a value of conductivity for the seeded flow.

The choice of magnet may also vary. Electromagnets have some advantages for aerodynamics applications, namely, much stronger B field generation and applicability for high-temperature applications (i.e. scramjet inlets). However, permanent rare-earth magnets generate a higher B field with respect to their overall weight and do not require a dedicated power supply. To reduce power consumption, rare-earth magnets may be more suitable. For example, a rare-earth neodymium-iron-boron (NB) magnet may reach a surface field strength of roughly 1.0 T; those that fit into the size of a subscale Lorentz force generator device described herein will likely range from 0.4 to 0.6 T. In an example such as that of FIG. 3, a magnet size would typically range from a 1 inch cube to a ⅜ inch cube.

To provide a rough estimate of the actuator magnetic field strength, the electric current and the Lorentz body force for a two-dimensional array of magnets and electrodes (assuming a perfect gas with a uniform conductivity profile), a computational magnetohydrodynamics program was used. Inputs to the program were: a free stream velocity, the flow conductivity, the electromagnetic geometry and the surface values of the electrode voltage and magnetic fields.

In general, the computational process begins with a laminar approximation of the boundary layer velocity profile over the flat plate.

Assuming the magnetic field is curl and divergence free, it can be computed from a scalar potential by the following:

$$\vec{B} = \nabla \psi \text{ (4) and } B_n = \frac{\partial \Psi}{\partial n}. \quad (5)$$

The electric field potential model uses the Poisson equation neglecting the Hall effect (although the Hall effect certainly could come into play in tests or otherwise) by the following equation:

$$\vec{J} = \sigma(-\nabla\phi + \vec{U} \times \vec{B}) \quad (6).$$

The MHD divergence-free current condition requires the following equations:

$$\nabla \cdot \vec{J} = 0 \quad (7) \text{ and}$$

$$\nabla \cdot (\sigma \nabla \phi) = \nabla \cdot (\sigma \vec{U} \times \vec{B}) \quad (8).$$

The Lorentz force is calculated from:

$$\vec{L} = \sigma(\vec{E} + \vec{U} \times \vec{B}) \quad (9).$$

Magnet and electrode dimensions were optimized along the width of the plate to provide a maximum value of the Lorentz body force per unit power consumption of the generator. An estimate of the power supply was extracted by averaging the two-dimensional value of $J(A/m^2)$ over the width of the positive electrodes and scaling with an arbitrary streamwise length. The Lorentz force was averaged over an arbitrary height from the surface of the flat plate for the comparison. Generally, it appeared that the width of the electrodes should be about half that of the magnets.

As shown in FIG. 6, which is from the described program, constructing a constant Lorentz force field across the width of a flat plate is very difficult due to the fact that the electric field is much higher near the edges of the electrodes. The resulting Lorentz body force is also markedly higher near the ends of the electrodes and falls to zero in the gaps between the magnets and electrodes. Thus, while a force field geometry is non-uniform, spikes in the Lorentz force occur over a very small volume with the rest of the force more uniform and increasing exponentially near to the surface of the flat plate.

It is important to note that one or many electromagnetic geometry configurations is possible. For a Lorentz force plate design as represented by FIG. 3, a power supply capable of delivering tens of kW was used; however additional options and/or variations are possible depending on there are any desired cost and/or weight limitations. With a low electrode voltage desired to prohibit arcing, a current draw from a few to 20 A is preferred. One cost effective and simple way to generate such a level of power as described is with up to 12 VDC batteries connected in series. Such batteries may include car batteries and/or smaller, high discharge motorcycle batteries, which may be more suitable. In one example, modular units of 10 batteries were assembled with interchangeable connector plates for use in series or charging in parallel. In another example, fifteen 120 VDC modules were assembled in which up to five would be used for a single electrode. After limiting the current to 20 A with load resistors and circuit breakers, the power supply would accommodate three electrodes at 600 VDC for a total output of 36 kW. Such a power supply is capable of producing an appreciable Lorentz force for conductivities ranging from 0.03-20 mho/m.

Figure 8:
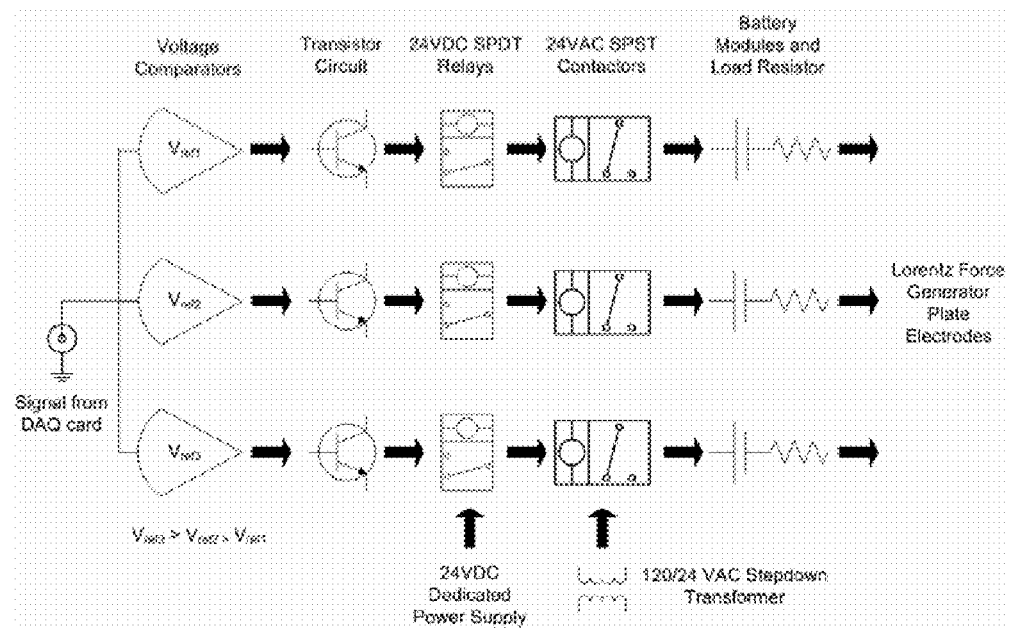
FIG. 8 depicts a representative power supply control system schematic.

In one or more embodiments, operation of the power supply described herein may be controlled as depicted in FIG. 8. To control the power supply, typically an analog control voltage signal is first passed to a set of three voltage comparators. The three comparators correspond to a maximum of three active (+V) electrodes when three electrodes are used for a Lorentz force generator plate described herein. The comparator reference voltages are set in numerical order so an increasing control voltage signal sent from a program will activate the electrodes one by one. Low power, computer compatible transistors are used to activate a 24 VDC SPDT relay, which in turn activates a 24 VAC SPST contactor in line with the main power supply for each electrode. The 24 VAC SPST contactors selected are typically used for air conditioning systems and can handle a large amount of power. They require a separate power supply, but that is easily satisfied with a 120 VAC power outlet and a transformer. Besides the battery modules, the rest of the electrode circuit consists of a load resistor to protect the batteries and a 20 A circuit breaker. The program may act as a circuit breaker because it measures the power supply current and may deactivate relays if it passes a user specified maximum value.

Figure 9:
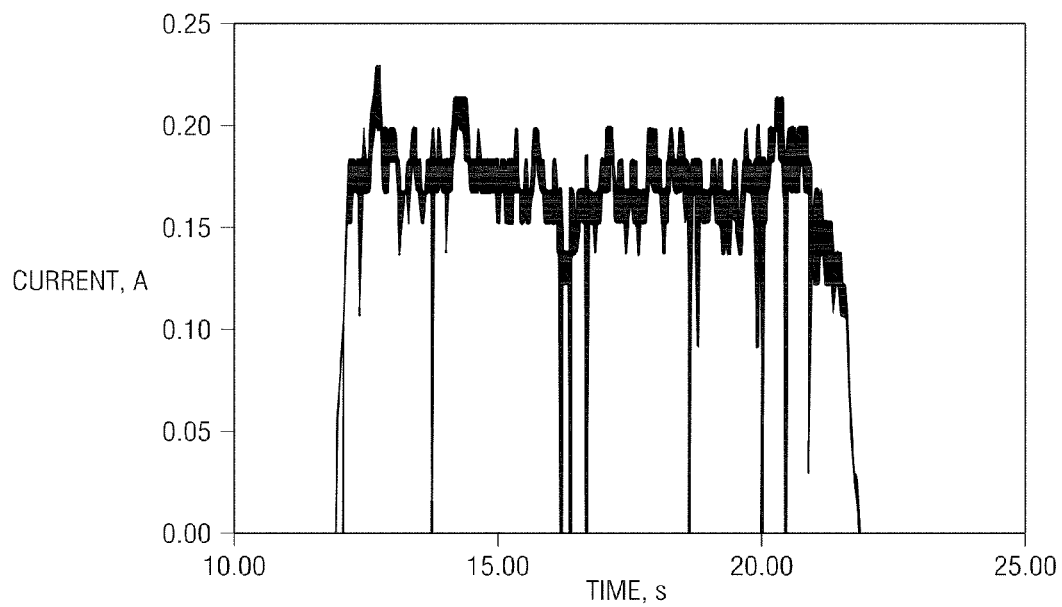
FIG. 9 depicts a typical current measurement for an interaction of ionization and Lorentz force power supplies, in which oscillations are spark discharges.

Power supply interaction between the Lorentz force plate and the ionization plate is an important issue. Because recombination rate of the ionized particles is not understood, an assumption was made that the two plates should be placed as close as possible to each other for the particles to be successfully convected downstream and be influenced by the Lorentz force. Yet, for a separation under 2 cm, the +20 kV ionization electrodes will interact with the Lorentz force electrodes through spark or arc discharges. Although the power supply for ionization is limited to a current output of 15 mA, FIG. 9 shows a charge builds up over the electrodes in a capacitor-like manner and results in much higher current values during arcing. For arcing from the ionization plate electrodes to the Lorentz force electrodes, the resulting current measured across the Lorentz force generator power supply was not negligible, which may lead to an undesirable situation, particularly for taking measurements. This is compounded by the fact that, for a continuous plasma cloud present over both plates, a conductive path between them will certainly exist and create an interaction current without arcing. A such, a pulsed signal for ionization may be preferable, such that Lorentz force generator current measurement signals should only see brief periods of interaction from the +20 kV electrodes.

In some instances, a pulsed RF signal, due to its alternating polarity, may be undesirable. For example, during a short pulse at −20 kV, the conductive path between the power supplies will result in current directed back to the ionization power supply. Although that power supply is supported by a diode and fuse, a Lorentz force generator power output may be too large to assume ionization safety components may not be damaged.

Figure 10A:
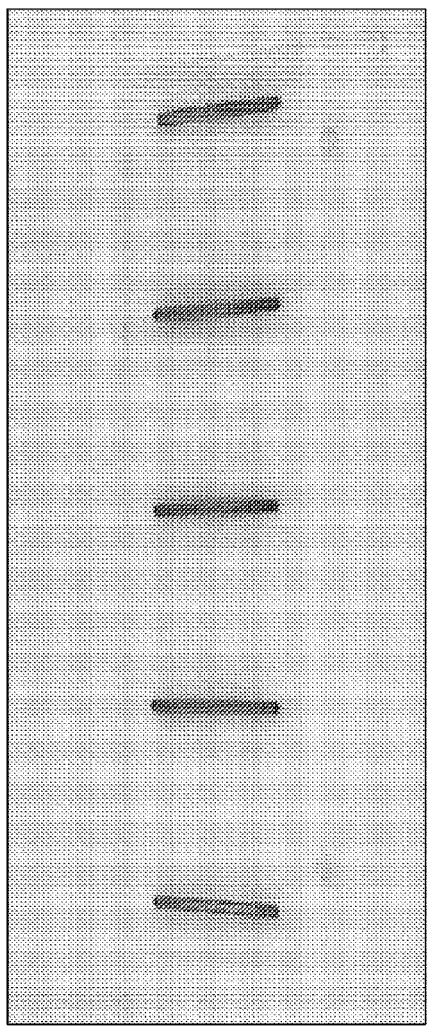
FIG. 10A illustrates a representative ionization plate setup.

Tests were conducted to illustrate ionization and Lorentz force plate concepts described herein. Raised levels of conductivity were observed using seeding with a conductive salt/water solution placed over electrodes configured as shown in FIG. 10. Ionization by a DC electric field was possible. The Lorentz force plate worked well, demonstrating an ability to control motion of an electrolyte solution placed across the electrodes as shown by images A-D of FIG. 11, in which the solution was a salt water mixture with a dye for visualization.

The ionization actuator plate used is that described with FIG. 3, with a DC power supply having an output range of 0-20 kV and a maximum current draw of 15 mA. Thus, such a power set-up has a capability of 300 W.

Figure 15:
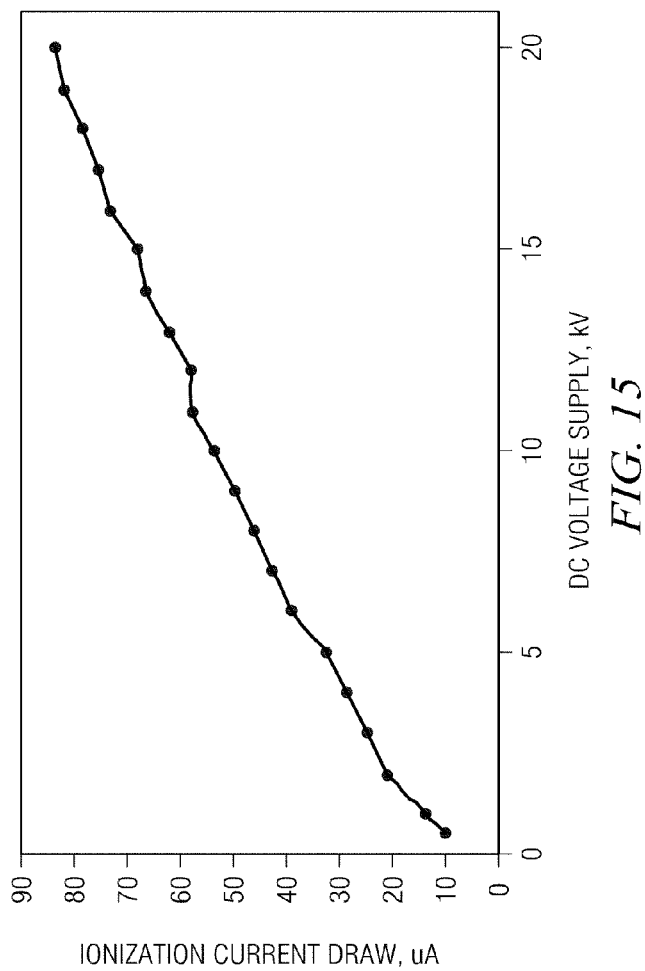
FIG. 15 depicts a representative ionization current versus DC supply voltage.

Voltage dependent current measurements are shown in FIG. 15, indicating the presence of a non-visible discharge at low voltages. As shown in FIG. 15, even comparatively low voltages created a glow discharge as evidence by the current readings. By extrapolation, a boundary layer flow velocity coupled with a higher fluid conductivity should increase the strength of the corona discharge.

Figure 10B:
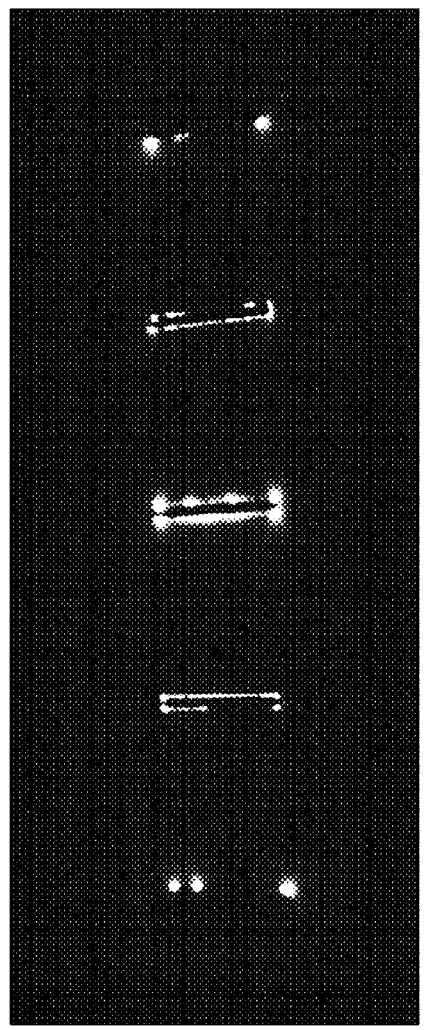
FIG. 10B illustrates corona discharge of a plate set-up of FIG. 10A at 20 kV.

Beginning around 16 kV, corona discharge was visible to the unaided eye in a relatively dark room; a representative image is depicted in FIG. 10B. At 20 kV, a uniform corona was intermittently visible across the electrodes. The glow discharge between electrodes was difficult to photograph; however, a distinct outline of the corona was observed (see FIG. 10B). A flow was established using a jet of pressurized air directed parallel to the surface of the plate. While the pressurized jet appeared to convect the visible corona discharge away, no measurements could be taken to determine if free ions were present downstream.

When an electrolyte solution of salt/water (14.92 wt. % NaCl) was introduced across the ionization plate with the pressurized jet, the average conductivity of the solution was estimated to be 0.25 mho/m. Some arcing due to introduction of an ionic solution into a corona discharge did occur. Such arcing should be less with DC voltage for supersonic ionization by flow discharge, because glow discharge conductivity is orders of magnitude less than the desired range. In addition, with pulsed current, arcing should be reduced.

Figure 14:
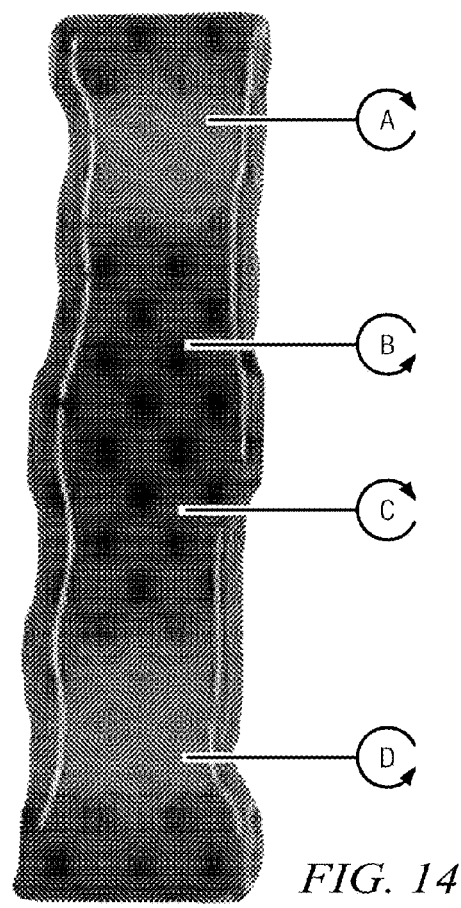
FIG. 14 depicts a representative visualization of two vortex dipoles.

Thus, as described, a Lorentz force plate was examined with a conducting material comprising a salt/water spread across its surface. Blue dye was added to the conducting material for additional visualization (FIGS. 11A-11D). The power supply was limited to 120 VDC coupled with an 11.6Ω load resistor. Upon activation of the power supply, an instantaneous movement forward by most of the liquid layer was observed (see arrows, FIGS. 11B-D). Images at 2.27, 2.34 and 2.41 seconds were captured. A rough calculation of the estimated velocity of the conducting material in its movement from a position at 2.27 seconds to 2.34 seconds was 0.5 m/s (relying on the front end of the suspension) at a conductivity of 0.25 mho/m and a potential of 100 V. This was compared with a sequence in which salt was removed from the water solution and injected with dye which revealed mere vortex dipoles created by the EM field. Apparently, the dye contained a very small amount of conductivity, but not enough to generate a Lorentz force capable of displacing the fluid off of the electrodes. No appreciable current from the power supply was detected. The dye rotated inside the water and resulted in the image shown in FIG. 14. Although such dipoles have a strong effect in the salt water solution, they have a negligible impact on the conductive seed-air experiments.

Figure 12:
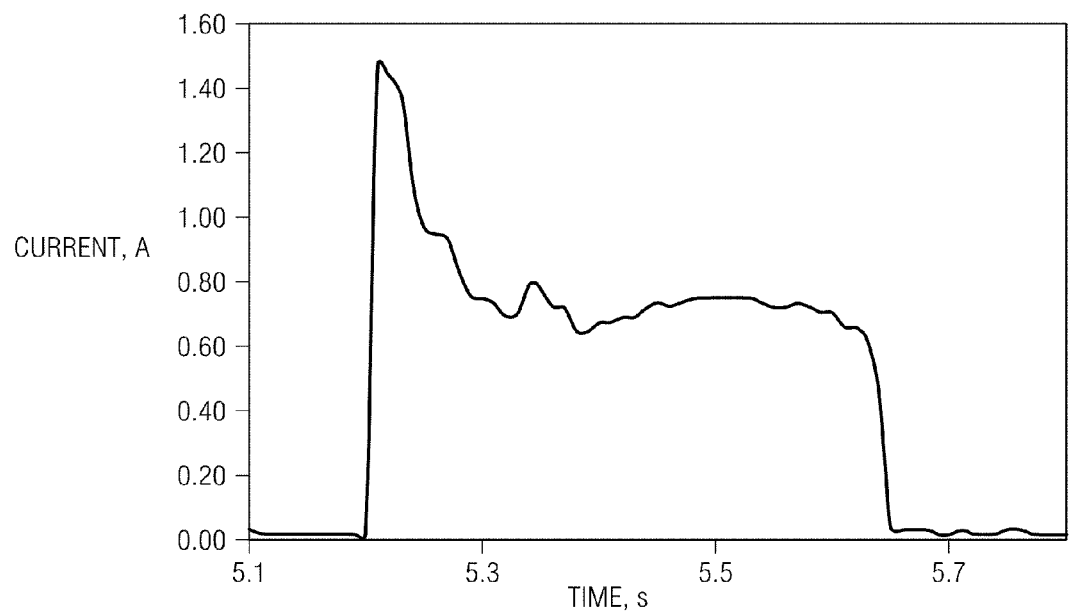
FIG. 12 illustrates current versus time during the actuation of a Lorentz force generator plate.
Figure 13:
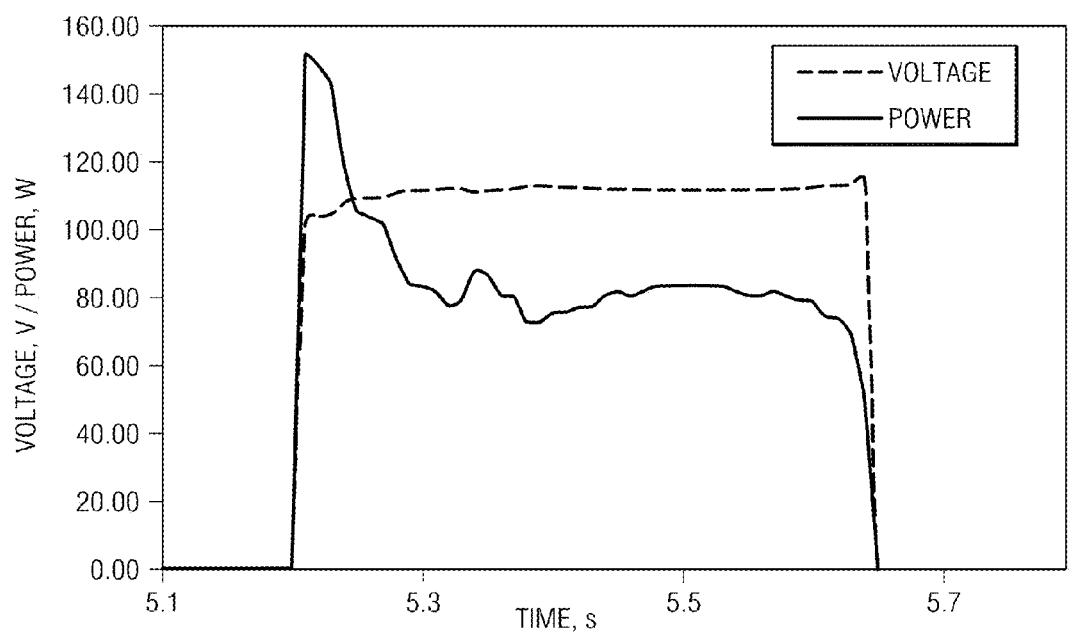
FIG. 13 illustrates voltage and power versus time during Lorentz force actuation.

Referring again to FIGS. 11A-D, if there was air flowing from right to left in the figure, the electromagnetic configuration would provide a retarding force. Note that the upstream ionization electrodes shown in the figure were removed from their ground so as to not interfere with the propagation of the mixture. The voltage was applied only to the center electrode with the two others serving as ground to direct the current flow needed for the Lorentz force to act in one direction. The width between the ground electrodes in the figure is about 4 inches. FIGS. 12 and 13 show the voltage, current and power measurements across said electrodes charted as a function of time. The power supply was only activated for a small amount of time because the mixture boiled quickly due to joule heating.

FIG. 12 shows that the current spiked to 1.5 A before falling to a more steady value of roughly 0.7 A, because most of the conductive layer moved off the plate the moment the power supply was turned on. The viscous effects of the water and the hydrophobic nature of the plate material caused the layer to build up more in the middle of the electrode gaps (see FIGS. 11B-D).

With the geometry and the information provided with FIGS. 11, 12 and 13, the average conductivity, Lorentz force and acceleration for the mixture when the power supply was activated were approximated. Using V=IR, the resistance across each gap between the electrodes was 140Ω. The conductance was the inverse of the resistance value, and dividing it by the length of the electrode gap yielded σ=0.25 mho/m. The value was less than the conductivity of sea water, indicating that only a small amount of sea salt was provided with the mixture. As such, higher sea salt concentrations were used in identical experiments that yielded current spikes of up to 6 A (data not shown). Because ca scales linearly with the current draw of the Lorentz force generator, the 6 A value indicates that a reached about 1 mho/m.

Although the Lorentz force was nonlinear, an order of magnitude approximation was made by defining a control volume over the electrode gap with a height equal to the height of the conducting layer placed on the plate. A Hall effect gauss meter was used to measure the three-dimensional magnetic field present over the configuration of FIG. 10. Averaging the magnetic field over a control volume height of 3 mm yields B≈0.3 T. The electric field strength was roughly averaged using the computational code results for E in the middle of the electrode gap, producing E≈2000 V/m. Since there was no flow velocity, L≈σE−500 N/m$^3$. This Lorentz force approximation is independent of B, but the magnetic field is still integral to the magnitude of the Lorentz force. Multiplying the body force by the control volume yields, L≈4 mN. Neglecting surface tension and friction forces and solving for α=F/m results in an instantaneous acceleration of about 0.5 m/s when the power supply was activated. Obviously, this value rises tremendously using air instead of water because of the differences in density.

As described, ionization of conducting particles occurred somewhere between upstream injection and EM field locations. Airflow may be seeded by both dry, sub-micron particles with low ionization potential or by aqueous solutions of similar materials.

A conducting solution as described reduced the voltage required to create a corona discharge by the ionization plate. While ionization of seeded air by an electric field presents several problems, notably an increased tendency for arcing as the conductivity within the boundary layer increases, an aqueous conducting solution comprising an electrolyte was accelerated or decelerated by the Lorentz force generator described herein, depending on the electromagnetic configuration. The examples demonstrate the ability of raising the conductivity of air to enable Lorentz force actuation under normal atmospheric conditions. A compact, flat plate Lorentz force actuator was validated; the described ionization plate showed corona discharge at atmospheric pressures before seeding. Hence, artificial seeding is effective for boundary layer flow control and for increasing boundary layer conductivity. Moreover, herein is described a means for low power and packaging, which is partly achieved through breaking up the ionization and Lorentz force components allowing the Lorentz force to be generated with very low voltages. Trying to ionize and produce a Lorentz force at the same time needs a high voltage and high current and potentially arcing.

In another example is a model designed for an actual wind tunnel preparation at Mach 3. The model is constructed to inject conducting material (as a powder or as a solution) over a ramp or cylinder. The geometries are generic geometries representing actual aircraft configurations. They, unfortunately, can cause the flow to separate. Such misbehavior is controlled as further described herein.

Figure 16A:
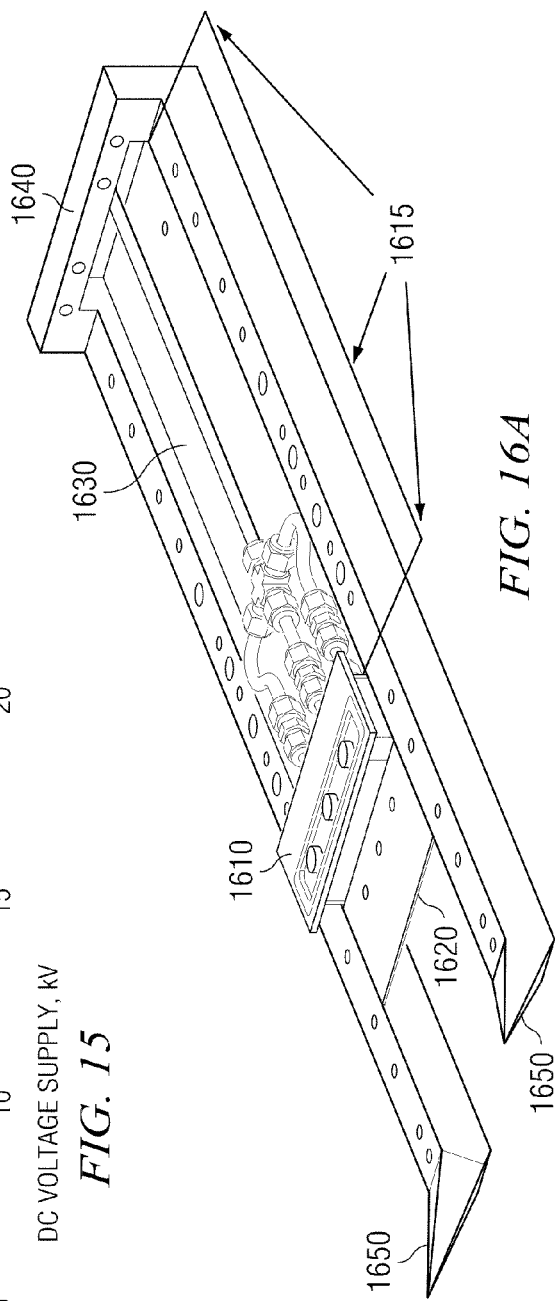
FIG. 16A shows a representative initial stage of construction of a model Lorentz force generator.

FIG. 16A is a representative initial stage of construction of the model having a base 1605 with seed injector heads 1610 and a seed delivery tubing with connectors 1615. In the model shown in FIG. 16A, three injector heads are shown. Also shown is front cover plate 1620 (that may be sharp-edged), a base cover plate 1630, a flat plate end support 1640 and two flat plate supports 1650. A suitable material for such components is stainless steel.

As depicted in FIG. 16B, above base 1605 is positioned one or more center spacing plates 1655 (depending on final dimensions) on top of plate supports 1650. A shielded chamber is thus created that houses and protects seed delivery tubing and connectors 1615. A Lorentz force plate 1660 is then positioned above center spacing plate(s) 1655 and adjacent flat plate support end and sized to allow a portion of the delivery tubing and connectors to continue to be protected (FIG. 16C). The circled area in FIG. 16C is enlarged in FIG. 16D showing electrodes 1665 and magnets 1670. In one example, the electrodes are copper electrodes have an approximate dimension of 0.2 inch by 0.5 inch by 0.125 inch and the magnets are a rare-earth neodymium-iron-boron with an approximate dimension of 0.5 inch by 0.5 inch by 1.0 inch. The Lorentz force plate may be made of any suitable dielectric material, such as an acetal copolymer, sapphire and certain ceramics, as examples. Importantly, the material will act as an insulator, can withstand high speeds and is heat resistant.

As depicted in FIG. 16E, the ionization source 1675 is positioned adjacent the Lorentz force plate which includes electrodes 1680. In the example, the electrodes are copper, each a dimension of 0.06 inch by 1.0 inch by 0.75 inch. Inset 16F shows the bottom and inset 16G shows the top of the ionization source plate.

Figure 16R:
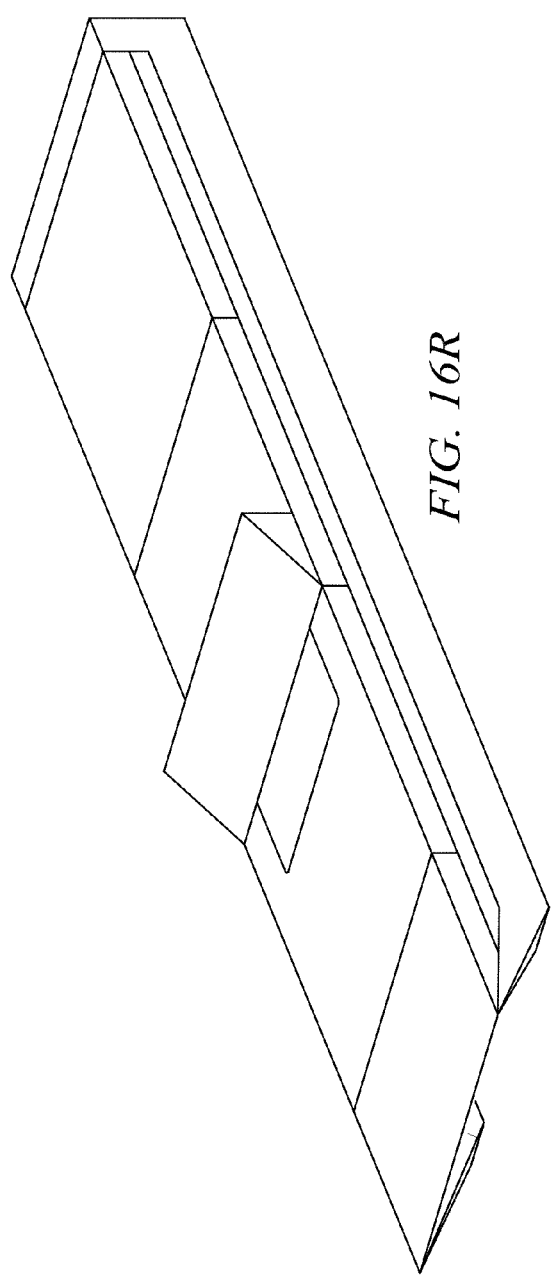
FIG. 16R shows a generic representation of a deflected flap of a further successive stage of construction of the model Lorentz force generator.
Figure 16S:
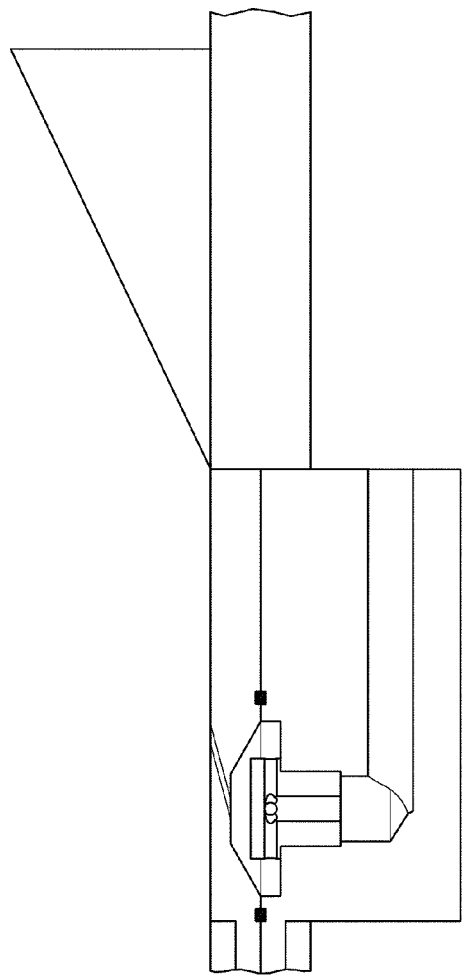
FIG. 16S shows a cross-sectional view of the stage of construction of the model Lorentz force generator of FIG. 16R.

A seed injection plate 1685 is depicted in the circled area of FIG. 16H which overlays seed injector heads 1610 and is positioned adjacent the ionization source plate. The top of the seed injection plate is shown in FIG. 16I and the bottom portion includes the seed injector heads as depicted in FIG. 16J. A side view showing a portion of the delivery tubes 1690 and connection 1695 is shown in FIG. 16K. An injection angle as depicts in FIG. 16K is preferred to inject into a boundary layer and not into the bulk flow. Typically, 15 degree angled injection ports are suitable. Additional components are laid down as shown in FIGS. 16L-16R. A sharp leading edge and flat surface as depicted in the model were constructed for improved control during testing and not essential to the design. FIGS. 16O and 16P shows a generic representation of a junction, such as that at a fuselage-wing intersection, which is an extremely difficult region to understand. FIGS. 16R and 16S show a generic representation of a deflected flap. FIG. 16S is a cross-sectional view of FIG. 16R.

Figure 17:
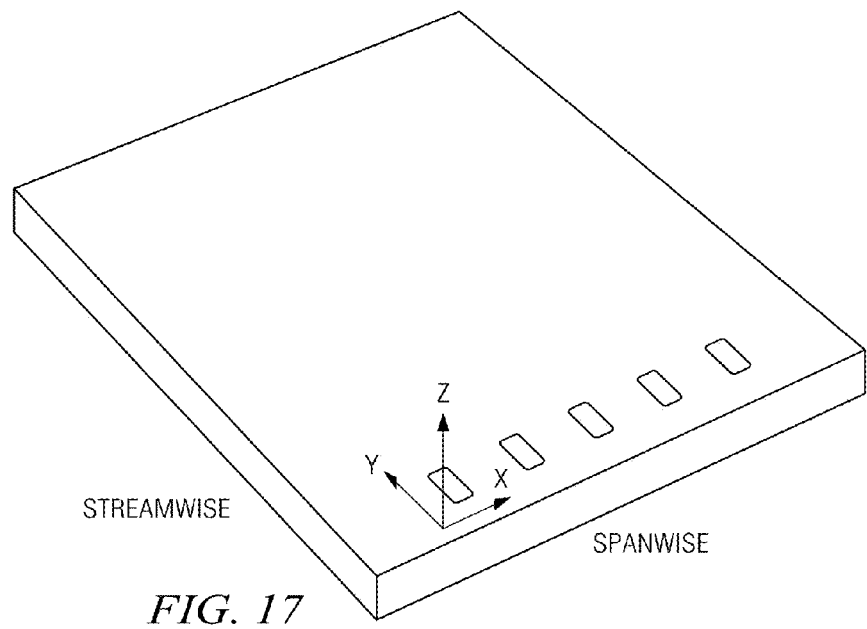
FIG. 17 depicts a force actuator described herein having a five electrode, 4 magnet configuration.

Using a force actuator construction as described and shown in top view in FIG. 17, three-dimensional magnetic field measurements were obtained using a 4 magnet and five electrode configuration (see FIG. 17). The magnets were nominally 0.5 T in strength. The Lorentz force plate was made of an acetal copolymer. A measurement spacing was 0.1 inch on each axis. Each field component (Bx, Bz) was measured over a volume of 4.25 inches by 1.25 inches by 0.5 inches. Over 5,280 measurements were taken, each precise and providing only an error of 5% or less. Representative examples are depicted in FIGS. 18-27.

Figure 18:
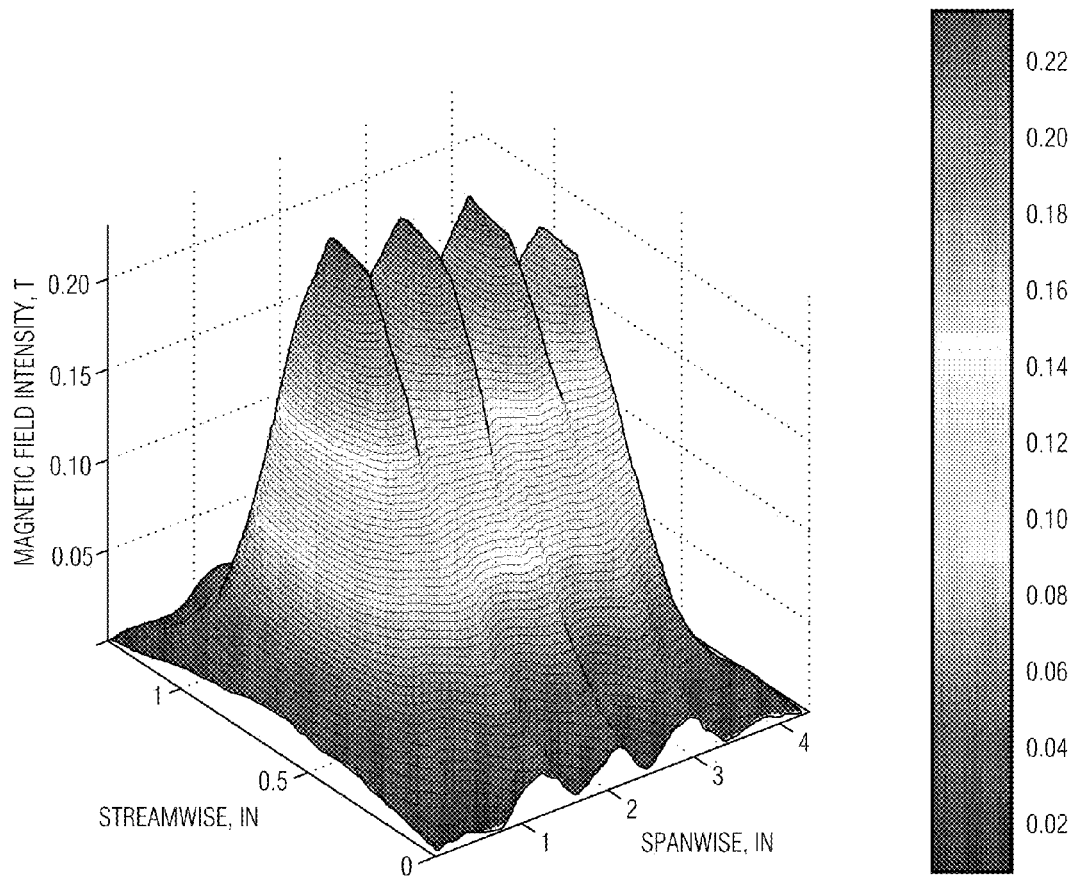
FIG. 18 illustrates in three dimensions the total B field at a height of 0.1 inch above the surface.

FIG. 18 illustrates in three dimensions the total B field at a height of 0.1 inch above the surface.

An actuation assembly for controlling a Lorentz force as described herein comprises alternating magnets and electrodes across the width of a surface perpendicular to the flow direction, each electrode pair crossing over one magnet face, with the magnetic poles interchanged across the width and grounded electrodes placed at each end of a plate to maintain a uniform force direction, wherein the Lorentz force may be accelerating or retarding.

A controller for actuation of one or more surfaces as described herein will comprise conducting materials provided as electrically charged electrolyte particles or droplets with electromagnetic fields in boundary layers.

Actuation for aerial vehicles generally comprises an electromagnetic field applied to an air or gas flow that is ionized by seeding with electromagnetically conducting materials.

As described herein, the interactions of the electrically charged conducting materials with electromagnetic fields in boundary layers are coordinated for the generation of control forces of one or more surfaces, particularly in aerodynamic applications. Conducting materials may be introduced by injection or atomization or to raise conductivity of a gas. Thus, injections may be wet or dry and using conducting materials in the form of droplets (as electrolytes), microparticles and/or nanoparticles. When applied to aerodynamic vehicles, the vehicles may include aircraft, rotorcraft and missiles, as examples.

Additional objects, advantages and novel features of the invention as set forth in the description, will be apparent to one skilled in the art after reading the foregoing detailed description or may be learned by practice of the invention. The objects and advantages of the invention may be realized and attained by means of the instruments and combinations particularly pointed out here.

What is claimed is:

1. A method for controlling a surface comprising:

injecting electromagnetically active conducting materials into an air flow proximate to a surface;

applying a first electric field downstream from an injection point to create a plasma; and applying a second electric field and a magnetic field downstream to the plasma wherein the second electric field and the magnetic field are oriented such that a force is exerted on the surface.

2. The method of claim 1, wherein the force exerted on the surface is on a surface of an aerial vehicle.

3. The method of claim 2, wherein the force exerted on the surface is substantially perpendicular to the surface.

4. The method of claim 1, wherein the force exerted on the surface is substantially parallel to the surface.

5. The method of claim 1, wherein the conducting materials are injected as droplets or as particles.

* * * * *